(12) United States Patent
Chien

(10) Patent No.: US 10,185,555 B2
(45) Date of Patent: **\*Jan. 22, 2019**

(54) METHOD FOR AUTOMATICALLY DETERMINING APPLICATION RECOMMENDATION RESULT BASED ON AUXILIARY INFORMATION AND ASSOCIATED COMPUTER READABLE MEDIUM AND USER INTERFACE

(71) Applicant: MEDIATEK INC., Hsin-Chu (TW)

(72) Inventor: Min-Hung Chien, Taichung (TW)

(73) Assignee: MEDIATEK INC., Hsin-Chu (TW)

( \* ) Notice: Subject to any disclaimer, the term of this patent is extended or adjusted under 35 U.S.C. 154(b) by 0 days.

This patent is subject to a terminal disclaimer.

(21) Appl. No.: 15/180,096

(22) Filed: Jun. 13, 2016

(65) Prior Publication Data

US 2016/0291969 A1    Oct. 6, 2016

Related U.S. Application Data

(63) Continuation of application No. 13/923,334, filed on Jun. 20, 2013, now Pat. No. 9,398,114.

(Continued)

(51) Int. Cl.
*G06F 15/16* (2006.01)
*G06F 8/70* (2018.01)
(Continued)

(52) U.S. Cl.
CPC .................. *G06F 8/70* (2013.01); *G06F 8/60* (2013.01); *G06F 8/61* (2013.01); *G06F 8/62* (2013.01);
(Continued)

(58) Field of Classification Search
CPC ......... H04L 63/20; H04L 67/10; H04L 51/08; H04L 63/10; H04L 63/102;
(Continued)

(56) References Cited

U.S. PATENT DOCUMENTS 6,636,836 B1  10/2003  Pyo
8,265,595 B1   9/2012  Reeves
(Continued)

FOREIGN PATENT DOCUMENTS

CN    101563672 A    10/2009
CN    101853184 A    10/2010

*Primary Examiner* — Djenane M Bayard
(74) *Attorney, Agent, or Firm* — Winston Hsu

(57) ABSTRACT

An application recommendation method includes following steps: checking at least one predetermined rule to generate at least one analysis result for at least one of a plurality of candidate applications; and automatically determining an application recommendation result of recommended applications, wherein the at least one of the candidate applications is selectively used as one recommended application in the application recommendation result according to the at least one analysis result. In addition, a computer readable medium stores a program code. When executed by a processor, the program code instructs the processor to perform steps of the application recommendation method. Moreover, a display screen shows an application hot zone according to the application recommendation result of recommended applications.

16 Claims, 6 Drawing Sheets

Related U.S. Application Data

(60) Provisional application No. 61/729,420, filed on Nov. 23, 2012.

(51) Int. Cl.
*H04L 29/08* (2006.01)
*G06F 8/60* (2018.01)
*G06F 8/61* (2018.01)
*G06F 8/65* (2018.01)

(52) U.S. Cl.
CPC .............. *G06F 8/65* (2013.01); *H04L 67/303* (2013.01); *H04L 67/306* (2013.01); *H04L 67/34* (2013.01)

(58) Field of Classification Search
CPC . H04L 41/0893; H04L 41/00; H04L 63/0815; H04L 63/0823; H04L 41/28; H04L 67/34; H04L 41/5096; H04L 43/0876; H04L 51/12; H04L 63/08; H04L 63/0263; H04L 67/025; H04L 29/06; H04L 41/0896
See application file for complete search history.

(56) References Cited

U.S. PATENT DOCUMENTS

| | | |
|---|---|---|
| 8,768,374 B1 | 7/2014 | Tran |
| 2007/0088532 A1 | 4/2007 | Alvarez |
| 2007/0168874 A1 | 7/2007 | Kloeffer |
| 2008/0184216 A1 | 7/2008 | Muedsam |
| 2009/0043840 A1 | 2/2009 | Cherukuri |
| 2010/0235433 A1 | 9/2010 | Ansari |
| 2013/0007579 A1* | 1/2013 | Dancy ............... G06F 17/30899 715/205 |
| 2013/0298185 A1 | 11/2013 | Koneru |
| 2015/0127628 A1* | 5/2015 | Rathod ................. H04W 4/206 707/710 |

\* cited by examiner

METHOD FOR AUTOMATICALLY DETERMINING APPLICATION RECOMMENDATION RESULT BASED ON AUXILIARY INFORMATION AND ASSOCIATED COMPUTER READABLE MEDIUM AND USER INTERFACE

CROSS REFERENCE TO RELATED APPLICATION

This is a continuation of U.S. application Ser. No. 13/923,334 filed Jun. 20, 2013, which claims the benefit of U.S. provisional application No. 61/729,420 filed Nov. 23, 2012. The entire contents of these related applications are incorporated herein by reference.

BACKGROUND

The disclosed embodiments of the present invention relate to application management and recommendation, and more particularly, to methods for automatically managing installed applications and determining an application recommendation result based on auxiliary information and related computer readable media.

With the development of smartphones and tablets, the number of applications (i.e., the amount of application software) is increased greatly. One smartphone/tablet may have a plenty of applications installed therein. However, not all of the installed applications are frequently used by the user. For example, some applications which may be installed a long time ago and are no longer used by the user now would occupy a larger memory space of the smartphone/tablet and have a large number of update notifications. Besides, the user may need to use a specific application at a certain time or a certain location. As the smartphone/tablet has a plenty of applications installed therein, searching the specific application from the installed applications is not an easy task for the user.

Thus, there is a need for an automatic application management and recommendation scheme to improve the user experience of using the smartphone/tablet with many applications installed therein.

SUMMARY

In accordance with exemplary embodiments of the present invention, methods for automatically managing installed applications and determining an application recommendation result based on auxiliary information and related computer readable media are proposed to solve the above-mentioned problem.

According to a first aspect of the present invention, an exemplary application recommendation method is disclosed. The exemplary application recommendation method includes: checking at least one predetermined rule to generate at least one analysis result for at least one of a plurality of candidate applications; and automatically determining an application recommendation result of recommended applications, wherein the at least one of the candidate applications is selectively used as one recommended application in the application recommendation result according to the at least one analysis result.

According to a second aspect of the present invention, an exemplary non-transitory computer readable medium storing a program code is disclosed. When executed by a processor, the program code instructs the processor to perform following steps for application recommendation: checking at least one predetermined rule to generate at least one analysis result for at least one of a plurality of candidate applications; and automatically determining an application recommendation result of recommended applications, wherein the at least one of the candidate applications is selectively used as one recommended application in the application recommendation result according to the at least one analysis result.

According to a third aspect of the present invention, an exemplary user interface of a user device is disclosed. The exemplary user interface includes a display screen arranged to show an application hot zone according to an automatically determined application recommendation result of recommended applications, wherein at least one of a plurality of candidate applications is selectively used as one recommended application in the automatically determined application recommendation result according to at least one analysis result generated for the at least one of the candidate applications by checking at least one predetermined rule.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
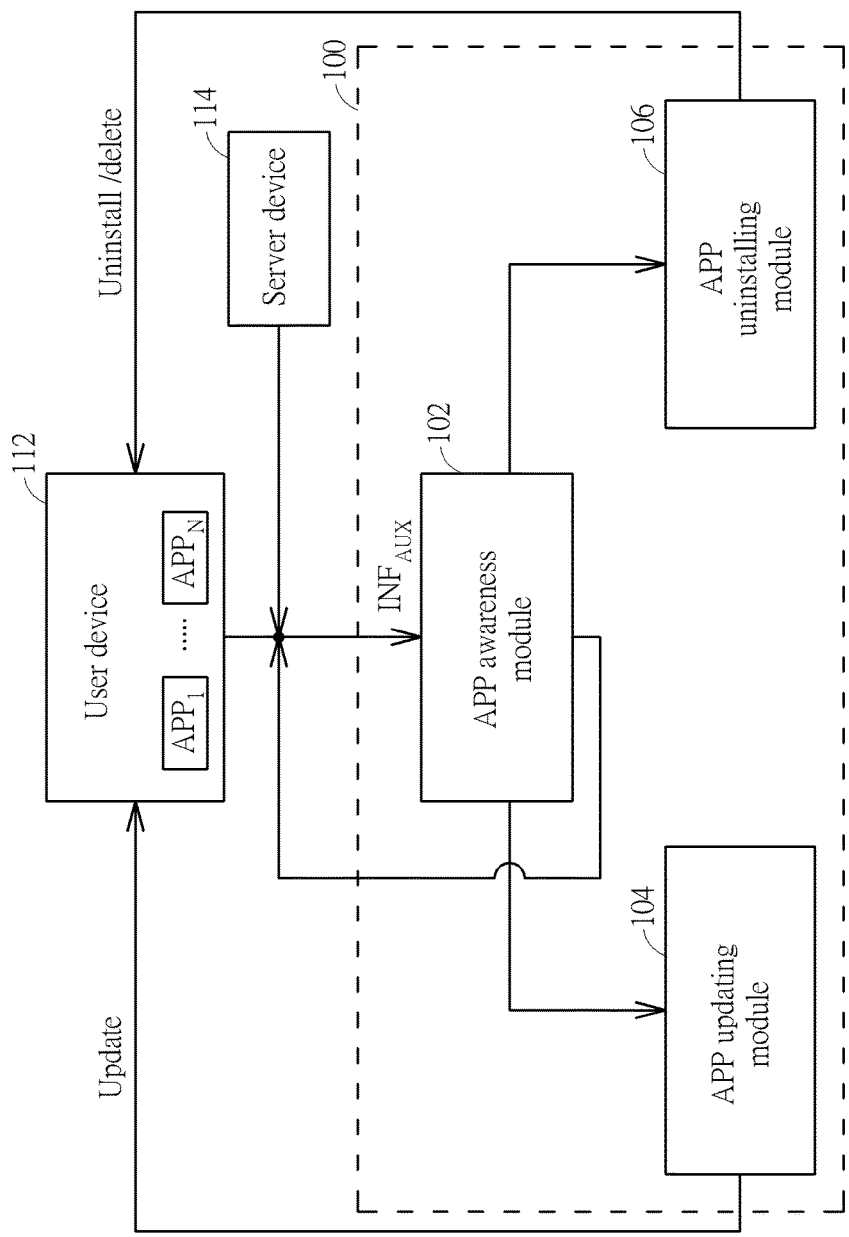
FIG. 1 is a block diagram illustrating an application management module according to an embodiment of the present invention.

FIG. 1 is a block diagram illustrating an application management module according to an embodiment of the present invention. The application management module 100 is arranged to automatically manage a plurality of applications $APP_1$-$APP_N$ installed on a user device (e.g., a smartphone or tablet) 112, where each of the applications $APP_1$-

$APP_N$ is downloaded from a server device 114 to the user device 112 and then installed in the user device 112. As shown in FIG. 1, the application management module 100 includes an application (APP) awareness module 102, an APP updating module 104 and an APP uninstalling module 106. The APP awareness module 102 is arranged for receiving auxiliary information $INF_{AUX}$ associated with applications $APP_1$-$APP_N$ installed on the user device 112, and analyzing the auxiliary information $INF_{AUX}$ based on a plurality of predetermined rules. Hence, the APP awareness module 102 would generate at least one analysis result for each of the applications $APP_1$-$APP_N$ based on at least one predetermined rule. After obtaining the analysis results of the applications $APP_1$-$APP_N$, the APP awareness module 102 refers to the analysis results to instruct either the APP updating module 104 or the APP uninstalling module 106 to automatically manage each of the applications $APP_1$-$APP_N$. Specifically, when the APP updating module 104 is instructed by the APP awareness module 102, an installed application is automatically updated to the latest version available on the server device 114; and when the APP uninstalling module 106 is instructed by the APP awareness module 102, an installed application is automatically uninstalled or deleted to free the occupied storage space. To put it simply, the application management module 100 is capable of automatically managing each of the applications $APP_1$-$APP_N$ according to corresponding analysis result (s). In this way, the use of the limited system resource of the user device 112 can be optimized. Further details of the APP awareness module 102 are described as below.

Figure 2:
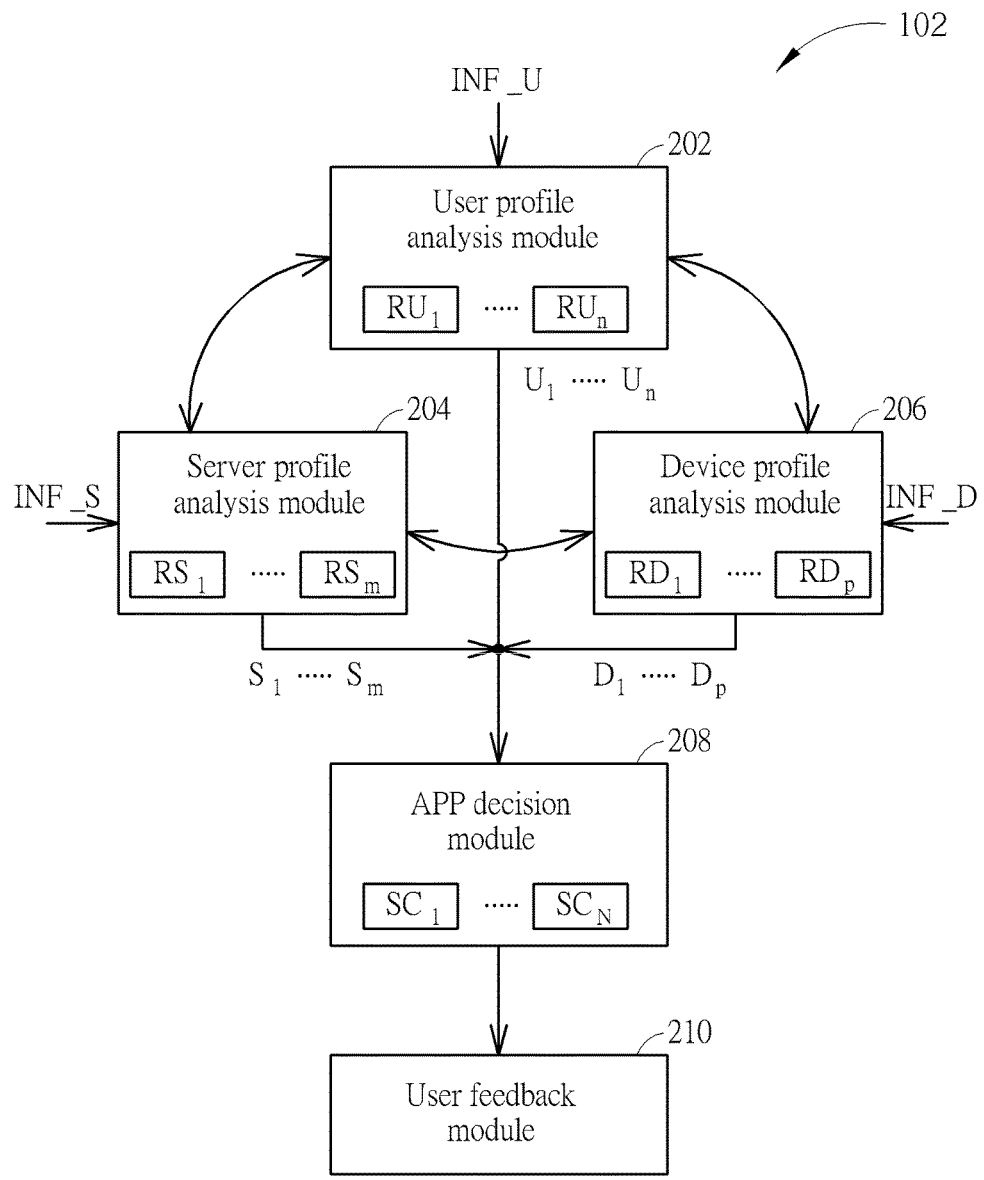
FIG. 2 is a block diagram illustrating an exemplary implementation of the APP awareness module shown in FIG. 1.

FIG. 2 is a block diagram illustrating an exemplary implementation of the APP awareness module 102 shown in FIG. 1. The APP awareness module 102 includes a user profile analysis module 202, a server profile analysis module 204, a device profile analysis module 206, an APP decision module 208, and a user feedback module 210. By way of example, but not limitation, the aforementioned auxiliary information $INF_{AUX}$ may include a user profile data INF_U, a server profile data INF_S and/or a device profile data INF_D. In a preferred embodiment, the auxiliary information $INF_{AUX}$ to be analyzed by the APP awareness module 102 includes different profile data. Specifically, all of user profile data INF_U, server profile data INF_S and device profile data INF_D may be processed by the APP awareness module 102 for better application management performance. However, this is not meant to be a limitation of the present invention.

The user profile data INF_U is maintained and provide by the user device 112, and may include information of user behavior of using the applications $APP_1$-$APP_N$ installed in the user device 112. For example, regarding each of the applications $APP_1$-$APP_N$, the user profile data INF_U may indicate the last use time of the application, the location (s) where the application has been used, whether the application is a favorite application set by the user, etc. The server profile data INF_S is maintained and provided by the server device 114, and may include application information of the applications $APP_1$-$APP_N$ installed in the user device 112. For example, regarding each of the applications $APP_1$-$APP_N$, the server profile data INF_S may indicate the latest version of the application, the user average evaluation of the application, whether the application is the best in the same category, the application size, etc. The device profile data INF_D is maintained and provided by the user device 112, and includes device capability information related to execution of the applications $APP_1$-$APP_N$ installed in the user device 112. For example, the device profile data INF_D may indicate the clock rate of the central processing unit (CPU), the clock rate of the graphics processing unit (GPU), the panel resolution, the wireless connectivity speed, etc. In other words, the device profile data INF_D includes resource information which indicates whether an application can smoothly run on the user device 112.

As mentioned above, the application management module 102 analyzes the auxiliary information $INF_{AUX}$ based on many predetermined rules to generate analysis result (s) for each installed application. In this embodiment, the user profile analysis module 202 is configured to have predetermined rules $RU_1$-$RU_n$ defined therein, the server profile analysis module 204 is configured to predetermined rules $RS_1$-$RS_m$ defined therein, and the device profile analysis module 206 is configured to have predetermined rules $RD_1$-$RD_p$ defined therein. It should be noted that the number of the predetermined rules defined in each analysis module may be adjusted, depending upon actual design requirement/consideration.

For each of the applications $APP_1$-$APP_N$, the user profile analysis module 202 generates analysis results $U_1$-$U_n$ by checking the predetermined rules $RU_1$-$RU_n$ based on the user profile data INF_U, the server profile analysis module 204 generates analysis results $S_1$-$S_m$ by checking the predetermined rules $RS_1$-$RS_m$ based on the server profile data INF_S, and the device profile analysis module 206 generates analysis results $D_1$-$D_p$ by checking the predetermined rules $RD_1$-$RD_p$ based on the device profile data INF_D. In one exemplary design, the user profile analysis module 202, the server profile analysis module 204 and the device profile analysis module 206 may operate separately. Several examples are given as below. However, this is not meant to be a limitation of the present invention. In another exemplary design, the user profile analysis module 202, the server profile analysis module 204 and the device profile analysis module 206 may exchange information with one another. Therefore, when one of the analysis modules is checking if a predetermined rule is met, additional information provided by another of the analysis modules may also be referenced to make a decision.

Regarding the user profile analysis module 202, one predetermined rule $RU_1$ may check if the last use time of an application is six months ago. When the predetermined rule $RU_1$ is met, the analysis result $U_1$ is set by a first logic value (e.g., 0) to indicate that the application should be uninstalled/deleted; otherwise, the analysis result $U_1$ is set by a second logic value (e.g., 1) to indicate that the application should be updated. Another predetermined rule $RU_2$ may check if a current location of the user device 112 is identical to location(s) where the application has been used. When the predetermined rule $RU_2$ is met, the analysis result $U_2$ is set by the second logic value (i.e., 1) to indicate that the application should be updated; otherwise, the analysis result $U_2$ is set by the first logic value (i.e., 0) to indicate that the application should be uninstalled/deleted. Another predetermined rule $RU_3$ may check if the application is a favorite application set by the user. When the predetermined rule $RU_3$ is met, the analysis result $U_3$ is set by the second logic value (i.e., 1) to indicate that the application should be updated; otherwise, the analysis result $U_3$ is set by the first logic value (i.e., 0) to indicate that the application should be uninstalled/deleted.

Regarding the server profile analysis module 204, one predetermined rule $RS_1$ may check if the latest version of the application is a new version. When the predetermined rule $RS_1$ is met, the analysis result $S_1$ is set by the second logic value (i.e., 1) to indicate that the application should be updated; otherwise, the analysis result $S_1$ is set by the first logic value (i.e., 0) to indicate that the application should be uninstalled/deleted. Another predetermined rule $RS_2$ may check if the user average evaluation of the application is higher than a threshold (e.g., 3-star rating). When the predetermined rule $RS_2$ is met, the analysis result $S_2$ is set by the second logic value (i.e., 1) to indicate that the application should be updated; otherwise, the analysis result $S_2$ is set by the first logic value (i.e., 0) to indicate that the application should be uninstalled/deleted. Another predetermined rule $RS_3$ may check if the application is the best in the same category. When the predetermined rule $RS_3$ is met, the analysis result $S_3$ is set by the second logic value (i.e., 1) to indicate that the application should be updated; otherwise, the analysis result $S_3$ is set by the first logic value (i.e., 0) to indicate that the application should be uninstalled/deleted. Another predetermined rule $RS_4$ may check if the application size is larger than a threshold (e.g., 100 M bytes). When the predetermined rule $RS_4$ is met, the analysis result $S_4$ is set by the first logic value (i.e., 0) to indicate that the application should be uninstalled/deleted; otherwise, the analysis result $S_4$ is set by the second logic value (i.e., 1) to indicate that the application should be updated.

Regarding the device profile analysis module 208, one predetermined rule $RD_1$ may check if the application is able to smoothly run on the user device 112 after updated. When the predetermined rule $RD_1$ is met, the analysis result $D_1$ is set by the second logic value (i.e., 1) to indicate that the application should be updated; otherwise, the analysis result $S_4$ is set by the first logic value (i.e., 0) to indicate that the application should be uninstalled/deleted.

After receiving the analysis results $U_1$-$U_n$, $S_1$-$S_m$, $D_1$-$D_p$ generated for each installed application, the APP decision module 208 calculates a final score for each installed application based on the corresponding analysis results $U_1$-$U_n$, $S_1$-$S_m$, $D_1$-$D_p$. Hence, the APP decision module 208 obtains final scores $SC_1$-$SC_N$ corresponding to the applications $APP_1$-$APP_N$, respectively. By way of example, but not limitation, each of the final scores $SC_1$-$SC_N$ may be calculated using following formulas.

$$SCORE_{(user)} = U_1 + U_2 + U_3 + \ldots + U_n \quad (1)$$

$$SCORE_{(server)} = S_1 + S_2 + S_3 + \ldots + S_m \quad (2)$$

$$SCORE_{(device)} = U_1 + U_2 + U_3 + \ldots + U_p \quad (3)$$

$$SCORE_{(final)} = SCORE_{(user)} + SCORE_{(server)} + SCORE_{(device)} \quad (4)$$

As mentioned above, an analysis result is set by the first logic value (i.e., 0) when it is determined that the application needs to be uninstalled/deleted, and is set by the second logic value (i.e., 1) when it is determined that the application needs to be updated. Thus, if $SCORE_{(user)} \geq (n/2)$, the user profile agrees with the action of updating the application; and if $SCORE_{(user)} < (n/2)$, the user profile agrees with the action of uninstalling/deleting the application. Similarly, if $SCORE_{(server)} \geq (m/2)$, the server profile agrees with the action of updating the application; and if $SCORE_{(server)} < (m/2)$, the server profile agrees with the action of uninstalling/deleting the application. If $SCORE_{(device)} \geq (p/2)$, the user profile agrees with the action of updating the application; and if $SCORE_{(device)} < (p/2)$, the device profile agrees with the action of uninstalling/deleting the application. In a case where the majority decision rule is employed, the action of updating the application is taken only when $SCORE_{(final)} \geq 2$. In other words, the APP decision module 208 determines that an applicant should be updated when a final score of the application is not smaller than 2, and determines that the application should be uninstalled/deleted when the final score of the application is smaller than 2. It should be noted that using the majority decision rule to determine whether an application should be updated or uninstalled is for illustrative purposes only. Using a different judgment rule to make a decision is also feasible.

In an alternative design, each of $SCORE_{(user)}$, $SCORE_{(server)}$ and $SCORE_{(device)}$ may be set by a weighted sum of analysis results.

$$SCORE_{(user)} = WU_1 * U_1 + W_2 * U_2 + WU_3 * U_3 + \ldots + WU_n * U_n \quad (5)$$

$$SCORE_{(server)} = WS_1 * S_1 + WS_2 * S_2 + S_3 * S_3 + \ldots + WS_m * S_m \quad (6)$$

$$SCORE_{(device)} = WD_1 * U_1 + WD_2 * U_2 + WD_3 * U_3 + \ldots + WD_p * U_p \quad (7)$$

The weighting factors $WU_1$-$WU_n$, $WS_1$-$WS_m$ and $WD_1$-$WD_p$ may be configured based on significance of the analysis results (i.e., significance of the predetermined rules). The same objective of obtaining a final score for each installed application is achieved.

In this embodiment, the application management module 102 further includes the user feedback module 210 which may check a user preference setting to verify the decision made by the APP decision module 208. Consider a case where the APP decision module 208 determines that a specific application should be uninstalled/deleted. When the user preference setting indicates the specific application is a favorite application set by the user, the user feedback module 210 is operative to change the decision made by the APP decision module 208 for preventing the specific application from being uninstalled/deleted erroneously.

Besides, the user feedback module 210 may further analyze the user feedback for rule adjustment. For example, based on a current setting of the predetermined rules, one specific application may be automatically uninstalled/deleted under the control of the application management module 102. However, after the specific application is uninstalled/deleted, the user feedback module 210 finds that the user manually re-installs the specific application, which means that the action of automatically uninstalling/deleting the specific application does not meet user's requirement and the current setting of the predetermined rules makes the APP decision module 208 misjudges that the specific application should be uninstalled/deleted. Hence, based on the user feedback, the user feedback module 210 may adjust at least one of the predetermined rules defined in the user profile analysis module 202, the server profile analysis module 204 and the device profile analysis module 206.

For another example, based on a current setting of the predetermined rules, one specific application may be automatically updated under the control of the application management module 102. However, after the specific application is updated, the user feedback module 210 finds that the user manually uninstalls the specific application, which means that the action of automatically updating the specific application does not meet user's requirement and the current setting of the predetermined rules makes the APP decision module 208 misjudges that the specific application should be updated. Hence, based on the user feedback, the user feedback module 210 may adjust at least one of the predetermined rules defined in the user profile analysis module 202, the server profile analysis module 204 and the device profile analysis module 206.

To put it simply, the application management module 102 is capable of enhancing the application management accuracy by fine-tuning the predetermined rules based on the user feedback. In this way, the installed applications can be adequately managed by the application management module 102 with less user intervention, thus improving user experience of using the user device 112.

The aforementioned judgment principle employed for application management, including application updating and application uninstalling/deleting, may also be employed for application recommendation. Please refer to FIG. 3, which is a block diagram illustrating an application recommendation module according to an embodiment of the present invention. The application recommendation module 300 is arranged to automatically determine an application recommendation result ARR. For example, the application recommendation result ARR may be referenced by a user device (e.g., a smartphone or tablet) 312 to show an application hot zone on a display screen of the user device 312, where the application hot zone shows application icons of recommended applications indicated by the application recommendation result ARR. If a recommended application is not installed in the user device 312 yet, the recommended application can be downloaded from the server device 314 to the user device 312 and then installed in the user device 312. If a recommended application is already installed in the user device 312, the recommended application can be directly selected and executed by the user device 312.

Figure 3:
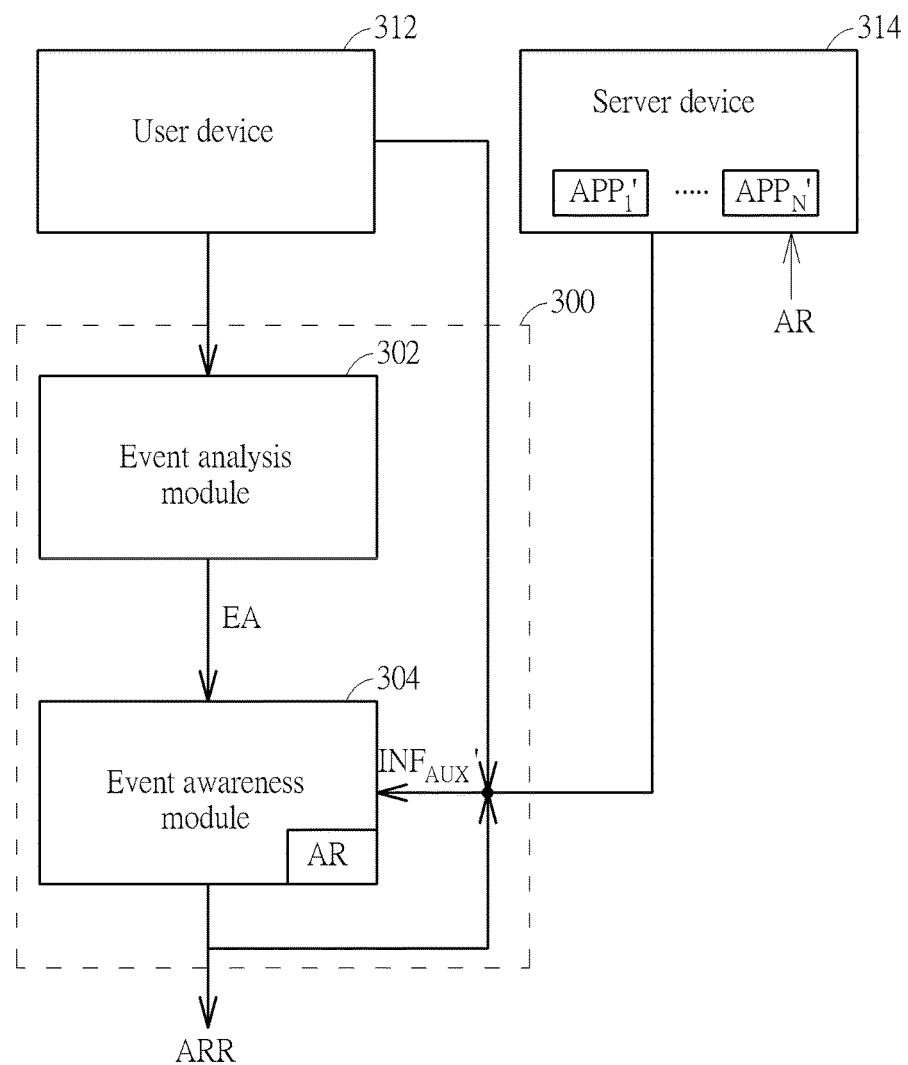
FIG. 3 is a block diagram illustrating an application recommendation module according to an embodiment of the present invention.

As shown in FIG. 3, the application recommendation module 300 includes an event analysis module 302 and an event awareness module 304. The event analysis module 302 is arranged to detect and analyze an event, and accordingly generate an event analysis result EA, where the event analysis result EA is referenced by the event awareness module 304 for determining an application recommendation range AR. The event may be triggered by location or time. For example, the user device 312 may be equipped with a global positioning system (GPS) receiver. Thus, the location of the user device 312 is monitored by the event analysis module 302. When the event analysis module 302 detects that the user device 312 moves for a long distance, the event analysis module 302 may generate the event analysis result EA indicative of a travel event. Hence, the application recommendation range AR is directed to travel-related applications, such as map applications, restaurant applications, hotel applications, city navigation applications, WiFi search applications, etc. Besides, the local date and local time of the user device 312 may also be monitored by the event analysis module 302. When the event analysis module 302 detects that today is a holiday, the event analysis module 302 may generate the event analysis result EA indicative of a holiday event. Hence, the application recommendation range AR is directed to holiday-related applications such as game applications.

In general, the server device 314 has a variety of applications. The application recommendation range AR is therefore used to narrow down the search range of recommended applications. More specifically, the event awareness module 304 determines a plurality of candidate applications $APP_1'$-$APP_N'$ according to the application recommendation range AR, and then selects recommended applications from the candidate applications $APP_1'$-$APP_N'$. The application recommendation range AR may define a single category (e.g., a game category) or a combination of multiple categories (e.g., a game category and a sports category). Besides, the application recommendation range AR may define a single selection rule or a combination of multiple selection rules. In short, with a proper setting of the application recommendation range AR, the search burden of the application recommendation module 300 can be eased. It should be note that one or more of the candidate applications $APP_1'$-$APP_N'$ may be installed in the user device 312 already or none of the candidate applications $APP_1'$-$APP_N'$ is installed in the user device 312 yet.

The event awareness module 304 is arranged for receiving auxiliary information $INF_{AUX}'$, and analyzing the auxiliary information $INF_{AUX}'$ based on a plurality of predetermined rules. Hence, the event awareness module 304 generates at least one analysis result for each candidate application based on at least one predetermined rule. After obtaining the analysis result (s) of each of the candidate applications $APP_1'$-$APP_N'$, the event awareness module 304 refers to the analysis results of the candidate applications $APP_1'$-$APP_N'$ to automatically determine the application recommendation result ARR of recommended applications selected from the candidate applications $APP_1'$-$APP_N'$. Further details of the event awareness module 304 are described as below.

Figure 4:
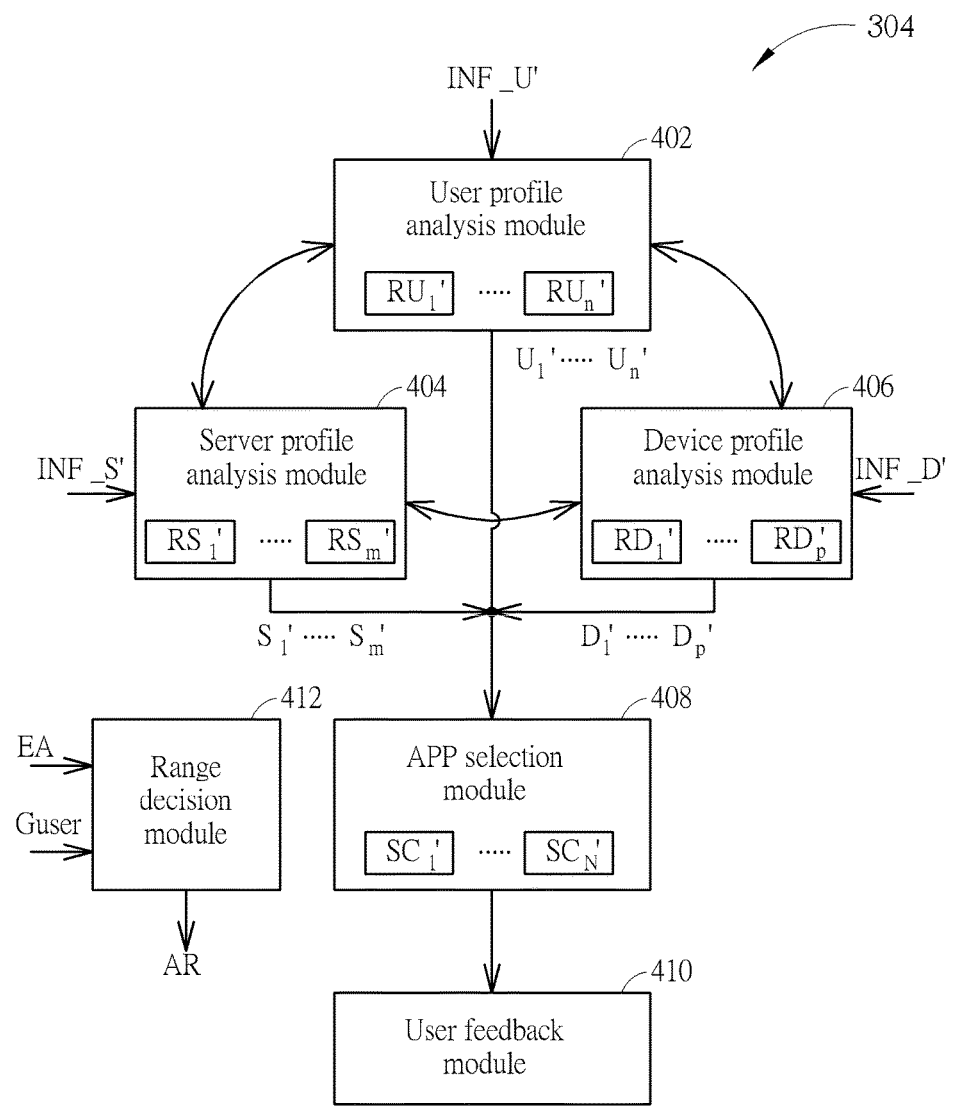
FIG. 4 is a block diagram illustrating an exemplary implementation of the APP awareness module shown in FIG. 3.

FIG. 4 is a block diagram illustrating an exemplary implementation of the event awareness module 304 shown in FIG. 3. The event awareness module 304 includes a user profile analysis module 402, a server profile analysis module 404, a device profile analysis module 406, an APP selection module 408, a user feedback module 410, and a range decision module 412. The range decision module 412 is arranged to determine the application recommendation range AR used for determining the candidate applications $APP_1'$-$APP_N'$. In this embodiment, the range decision module 412 may determine the application recommendation range AR by referring to at least one of the event analysis result EA and a user group $G_{user}$ to which a user of the user device 312 belongs. For example, different users may be categorized into different user groups since different users may have different favorite applications. Thus, based on the user group $G_{user}$ to which a user of the user device 312 belongs, the search range of the recommended applications can be narrowed down for achieving better application recommendation performance.

The aforementioned auxiliary information $INF_{AUX}'$ may include a user profile data INF_U', a server profile data INF_S' and/or a device profile data INF_D'. In a preferred embodiment, the auxiliary information $INF_{AUX}'$ to be analyzed by the event awareness module 304 includes different profile data. Specifically, all of user profile data INF_U', server profile data INF_S' and device profile data INF_D' may be processed by the event awareness module 304 for better application recommendation performance. However, this is not meant to be a limitation of the present invention.

The user profile data INF_U' is maintained and provide by the user device 312, and may include user preference information. For example, the user profile data INF_U' may indicate a user-defined recommended category, a current location of the user device 312, user's preference of applications (i.e., the user favors free applications or pay applications), etc. The server profile data INF_S' is maintained and provided by the server device 314, and includes application information of the candidate applications $APP_1'$-$APP_N'$. For example, regarding each of the candidate applications $APP_1'$-$APP_N'$, the server profile data INF_S' may indicate the number of download times of the candidate application, the user average evaluation of the candidate application, the application size of the candidate application, the price of the candidate application, etc. The device profile data INF_D' is maintained and provided by the user device 312, and includes device capability information related to execution of the candidate applications $APP_1'$-$APP_N'$. For example, the device profile data INF_D' may indicate the CPU clock rate, the GPU clock rate, the panel resolution, the wireless connectivity speed, etc. In other words, the device profile data INF_D' includes resource information which indicates whether a candidate application can smoothly run on the user device 312.

As mentioned above, the event awareness module 304 analyzes the auxiliary information $INF_{AUX}'$ based on many predetermined rules to generate analysis result (s) for each candidate application. Hence, the user profile analysis module 402 is configured to have predetermined rules $RU_1'$-$RU_n'$ defined therein, the server profile analysis module 404 is configured to have predetermined rules $RS_1'$-$RS_m'$ defined therein, and the device profile analysis module 406 is configured to have predetermined rules $RD_1'$-$RD_p'$ defined therein. For each of the candidate applications $APP_1'$-$APP_N'$, the user profile analysis module 402 generates analysis results $U_1'$-$U_n'$ by checking the predetermined rules $RU_1'$-$RU_n'$ based on the user profile data INF_U', the server profile analysis module 404 generates analysis results $S_1'$-$S_m'$ by checking the predetermined rules $RS_1'$-$RS_m'$ based on the server profile data INF_S', and the device profile analysis module 406 generates analysis results $D_1'$-$D_p'$ by checking the predetermined rules $RD_1'$-$RD_p'$ based on the device profile data INF_D'. It should be noted that the number of the predetermined rules defined in each analysis module may be adjusted, depending upon actual design requirement/consideration. Further, the predetermined rules employed for application recommendation are not the same as that employed for application management.

In one exemplary design, the user profile analysis module 402, the server profile analysis module 404 and the device profile analysis module 406 may operate separately. Several examples are given as below. However, this is not meant to be a limitation of the present invention. In another exemplary design, the user profile analysis module 402, the server profile analysis module 404 and the device profile analysis module 406 may exchange information with one another. Therefore, when one of the analysis modules is checking if a predetermined rule is met, additional information provided by another of the analysis modules may also be referenced to make a decision.

Regarding the user profile analysis module 302, one predetermined rule $RU_1'$ may check if the candidate application belongs to the user-defined recommended category. When the predetermined rule $RU_1'$ is met, the analysis result $U_1$ is set by a first logic value (e.g., 1) to indicate that the candidate application should be recommended; otherwise, the analysis result $U_1'$ is set by a second logic value (e.g., 0) to indicate that the candidate application should not be recommended. Another predetermined rule $RU_2'$ may check if the candidate application is suitable for the current location of the user device 112. When the predetermined rule $RU_2'$ is met, the analysis result $U_2'$ is set by the first logic value (e.g., 1) to indicate that the candidate application should be recommended; otherwise, the analysis result $U_2'$ is set by the second logic value (e.g., 0) to indicate that the candidate application should not be recommended. Another predetermined rule $RU_3'$ may check if the candidate application is a desired application of the user (i.e., a free application when the user favors free applications or a pay application when the user favors pay applications). When the predetermined rule $RU_3'$ is met, the analysis result $U_3'$ is set by the first logic value (e.g., 1) to indicate that the candidate application should be recommended; otherwise, the analysis result $U_3'$ is set by the second logic value (e.g., 0) to indicate that the candidate application should not be recommended.

Regarding the server profile analysis module 404, one predetermined rule $RS_1'$ may check if the number of download times is larger than a threshold (e.g., 100 K). When the predetermined rule $RS_1'$ is met, the analysis result $S_1'$ is set by the first logic value (e.g., 1) to indicate that the candidate application should be recommended; otherwise, the analysis result $S_1'$ is set by the second logic value (e.g., 0) to indicate that the candidate application should not be recommended. Another predetermined rule $RS_2'$ may check if the user average evaluation is higher than a threshold (e.g., 4-star rating). When the predetermined rule $RS_2'$ is met, the analysis result $S_2'$ is set by the first logic value (e.g., 1) to indicate that the candidate application should be recommended; otherwise, the analysis result $S_2'$ is set by the second logic value (e.g., 0) to indicate that the candidate application should not be recommended. Another predetermined rule $RS_3'$ may check if the application size is smaller than a threshold (e.g., 50 M bytes). When the predetermined rule $RS_3'$ is met, the analysis result $S_3'$ is set by the first logic value (e.g., 1) to indicate that the candidate application should be recommended; otherwise, the analysis result $S_3'$ is set by the second logic value (e.g., 0) to indicate that the candidate application should not be recommended. Another predetermined rule $RS_4'$ may check if the application price is lower than a threshold (i.e., $2.99). When the predetermined rule $RS_4'$ is met, the analysis result $S_4'$ is set by the first logic value (e.g., 1) to indicate that the candidate application should be recommended; otherwise, the analysis result $S_4'$ is set by the second logic value (e.g., 0) to indicate that the candidate application should not be recommended.

Regarding the device profile analysis module 308, one predetermined rule $RD_1'$ may check if the candidate application can smoothly run on the user device 312. When the predetermined rule $RD_1'$ is met, the analysis result $D_1'$ is set by the first logic value (e.g., 1) to indicate that the candidate application should be recommended; otherwise, the analysis result $S_4'$ is set by the second logic value (e.g., 0) to indicate that the candidate application should not be recommended.

After receiving the analysis results $U_1'$-$U_n'$, $S_1'$-$S_m'$, $D_1'$-$D_p'$ generated for each candidate application, the APP selection module 408 calculates a final score for each candidate application based on the corresponding analysis results $U_1'$-$U_n'$, $S_1'$-$S_m'$, $D_1'$-$D_p'$. Hence, the APP selection module 408 obtains final scores $SC_1'$-$SC_N'$ corresponding to the candidate applications $APP_1'$-$APP_N'$, respectively. In one exemplary design, each of the final scores $SC_1'$-$SC_N'$ may be calculated using following formulas.

$$SCORE_{(user)} = U_1' + U_2' + U_3' + \ldots + U_n' \tag{8}$$

$$SCORE_{(server)} = S_1' + S_2' + S_3' + \ldots + S_m' \tag{9}$$

$$SCORE_{(device)} = U_1' + U_2' + U_3' + \ldots + U_p' \tag{10}$$

$$SCORE_{(final)} = SCORE_{(user)} + SCORE_{(server)} + SCORE_{(device)} \tag{11}$$

In an alternative design, each of $SCORE_{(user)}$, $SCORE_{(server)}$ and $SCORE_{(device)}$ may be set by a weighted sum of analysis results.

$$SCORE_{(user)} = WU_1'*U_1' + WU_2'*U_2' + WU_3'*U_3' + \ldots + WU_n'*U_n' \tag{12}$$

$$SCORE_{(server)} = WS_1'*S_1' + WS_2'*S_2' + WS_3'*S_3' + \ldots + WS_m'*S_m' \tag{13}$$

$$SCORE_{(device)} = WD_1'*U_1'WD_2'*U_2' + WD_3'*U_3' + \ldots + WD_p'*U_p' \tag{14}$$

The weighting factors $WU_1'$-$WS_n'$-$WS_1'$-$WS_m'$ and $WD_1'$-$WD_p'$ may be configured based on significance of the analysis results (i.e., significance of the predetermined rules). The same objective of obtaining a final score for each candidate application is achieved.

As mentioned above, an analysis result is set by the first logic value (e.g., 1) when it is determined that the candidate application needs to be recommended, and is set by the second logic value (e.g., 0) when it is determined that the candidate application does not need to be recommended. Thus, the larger is a final score $SCORE_{(final)}$ of a candidate application, the priority of selecting the candidate application as a recommended application is higher. Hence, the APP selection module 408 selects the top N candidate applications with final scores larger than that of remaining candidate applications as the recommended applications for the user of the user device 312, and therefore determines the application recommendation result ARR correspondingly. The value N may be any integer, depending upon actual design requirement/consideration.

Figure 5:
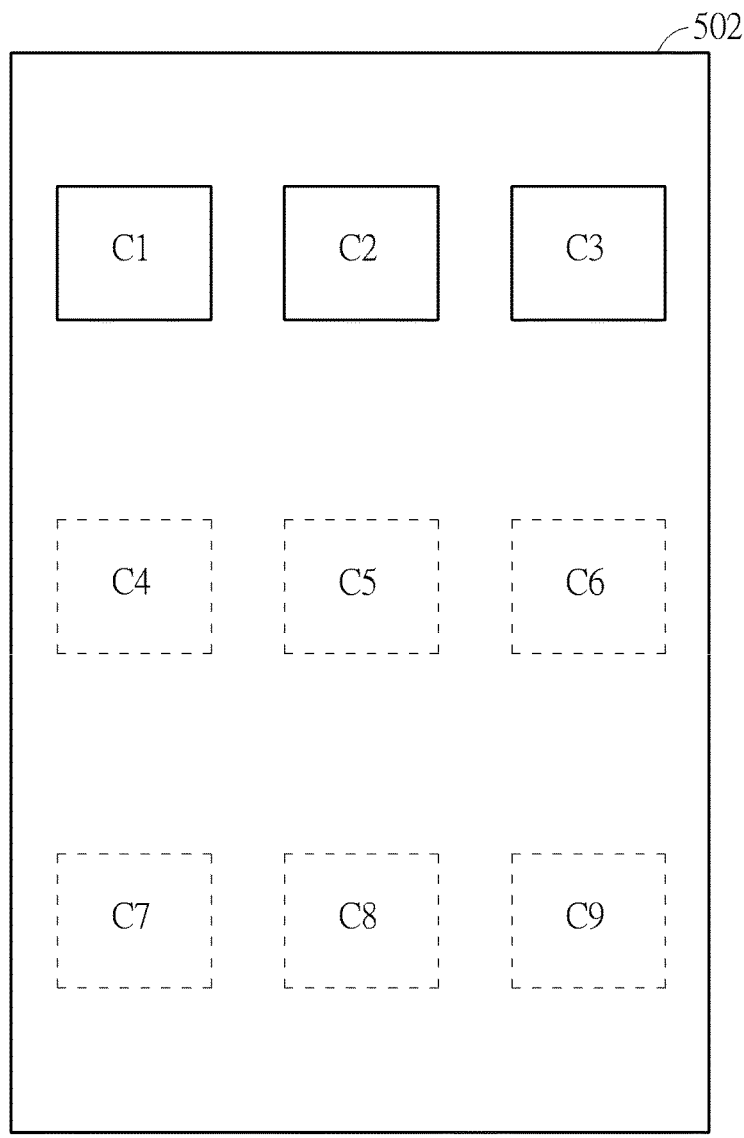
FIG. 5 is a diagram illustrating an example of an application hot zone displayed on a display screen of a user device.

The user interface (UI) of the user device 312 shows an application hot zone based on the application recommendation result ARR. Please refer to FIG. 5, which is a diagram illustrating an example of an application hot zone displayed on a display screen of the user device 312. In this example, the APP selection module 408 determines the application recommendation result ARR by selecting 9 candidate applications, each having a final score larger than that of remaining candidate applications, as the recommended applications. The application icons C1-C9 of the recommenced applications are shown on the display screen 502 of the user device 312. In one exemplary design, the application icons C1-C3 of the recommenced applications which have been installed on the user device 312 are non-transparent icons, while the application icons C4-C9 of the recommenced applications which are not installed on the user device 312 are transparent icons. When the user clicks one of the non-transparent icons C1-C3, a corresponding recommenced application installed in the user device 312 is selected and then executed. When the user clicks one of the transparent icons C4-C9, an installation procedure of a corresponding recommended application will be activated.

In this embodiment, the event awareness module 304 further includes the user feedback module 410 which may analyze the user feedback for rule adjustment. For example, based on a current setting of the predetermined rules, one specific application may be automatically recommended under the control of the event awareness module 304. However, after the specific application is recommended, the user feedback module 410 finds that the user does not select and use the recommended specific application for a long period of time, which means that the action of automatically recommending the specific application does not meet user's requirement and the current setting of the predetermined rules makes the APP selection module 408 misjudges that the specific candidate application should be recommended. Hence, based on the user feedback, the user feedback module 410 may adjust at least one of the predetermined rules defined in the user profile analysis module 402, the server profile analysis module 404 and the device profile analysis module 406.

For another example, based on a current setting of the predetermined rules, one specific application is not automatically recommended under the control of the event awareness module 304. However, after the application recommendation result ARR is determined, the user feedback module 410 finds that the user manually selects and uses the specific application which is not a recommended application. This means that the action of automatically recommending applications does not meet user's requirement, and the current setting of the predetermined rules makes the APP selection module 408 misjudges that the specific application should not be recommended. Hence, based on the user feedback, the user feedback module 410 may adjust at least one of the predetermined rules defined in the user profile analysis module 402, the server profile analysis module 404 and the device profile analysis module 406.

To put it simply, the application recommendation module 300 is capable of enhancing the user experience of using the user device 312 by automatically recommending different applications to the user at different locations, different dates and/or different times.

Figure 6:
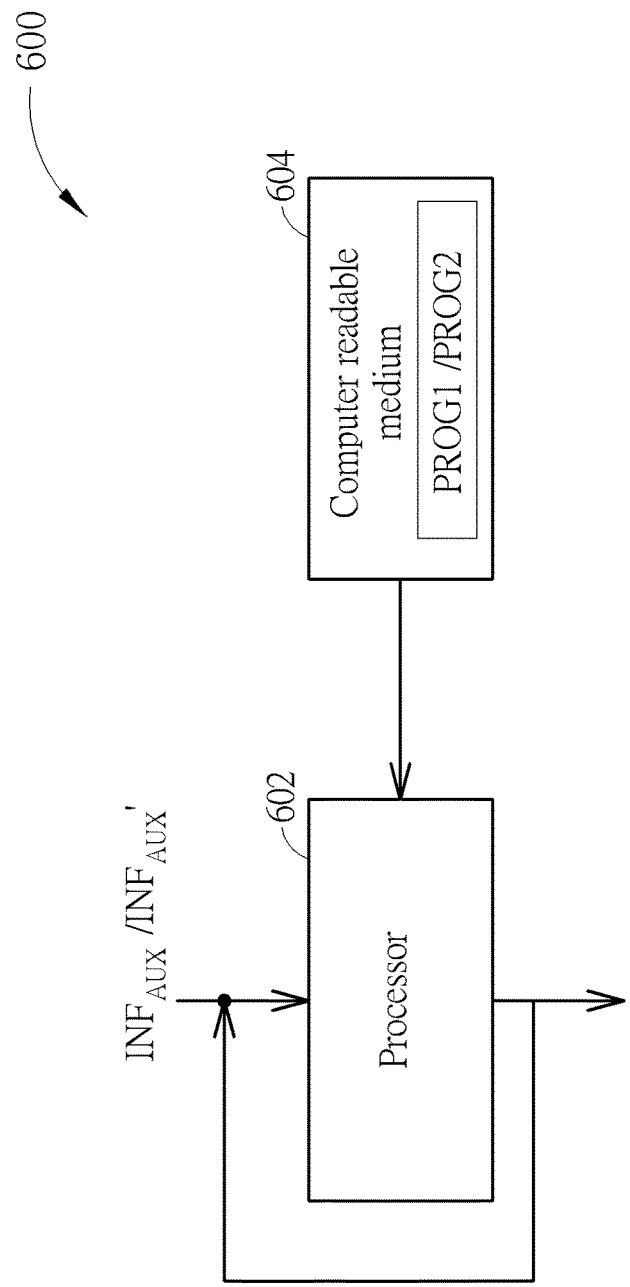
FIG. 6 is a diagram illustrating an electronic device according to an embodiment of the present invention.

The aforementioned application management module 100 and the application recommendation module 300 may be implemented using software. Please refer to FIG. 6, which is a diagram illustrating an electronic device according to an embodiment of the present invention. By way of example, but not limitation, the electronic device 600 may be a portion of the user device 112/312. The electronic device 600 includes a processor 602 and a computer readable medium 604. For example, the computer readable medium 604 may be a non-volatile memory. The computer readable medium 604 stores a first program code PROG1 and/or a second program code PROG2. When the first program code PROG1 is executed by the processor 602, the first program code PROG1 instructs the processor 602 to perform application management, thus realizing the aforementioned application management module 100. When the second program code PROG2 is executed by the processor 602, the second program code PROG2 instructs the processor 602 to perform application recommendation, thus realizing the aforementioned application recommendation module 300.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An application recommendation method, comprising:
checking at least one predetermined rule to generate at least one analysis result for each of a plurality of candidate applications; and
automatically determining an application recommendation result of recommended applications, wherein one of the candidate applications is selectively used as one recommended application in the application recommendation result according to analysis results of the candidate applications;
wherein the step of automatically determining the application recommendation result comprises:
calculating a final score for said each of the candidate applications according to the at least one analysis result of said each of the candidate applications;
comparing final scores of the candidate applications to select a target group of candidate applications from the candidate applications, wherein the candidate applications include a first group of candidate applications and a second group of candidate applications, a final score of each candidate application included in the first group of candidate applications is larger than a final score of each candidate application included in the second group of candidate applications, and only one of the first group of candidate applications and the second group of candidate applications is selected as the target group of candidate applications; and setting the application recommendation result of recommended applications by the target group of candidate applications.

2. The application recommendation method of claim 1, further comprising:
    determining an application recommendation range according to an event triggered by at least one of location and time; and
    determining the candidate applications according to the application recommendation range.

3. The application recommendation method of claim 1, further comprising:
    receiving auxiliary information; and
    analyzing the auxiliary information based on a plurality of predetermined rules, such that the at least one analysis result is generated for said each of the candidate applications.

4. The application recommendation method of claim 3, wherein the auxiliary information comprises a user profile data including user preference information.

5. The application recommendation method of claim 4, wherein the user preference information comprises at least one of a user-defined recommended application category, a current location of a user device, and a user's preference of applications.

6. A non-transitory computer readable medium storing a program code, wherein when executed by a processor, the program code instructs the processor to perform following steps for application recommendation:
    checking at least one predetermined rule to generate at least one analysis result for each of a plurality of candidate applications; and
    automatically determining an application recommendation result of recommended applications, wherein one of the candidate applications is selectively used as one recommended application in the application recommendation result according to analysis results of the candidate applications;
    wherein the step of automatically determining the application recommendation result comprises:
    calculating a final score for said each of the candidate applications according to the at least one analysis result of said each of the candidate applications;
    comparing final scores of the candidate applications to select a target group of candidate applications from the candidate applications, wherein the candidate applications include a first group of candidate applications and a second group of candidate applications, a final score of each candidate application included in the first group of candidate applications is larger than a final score of each candidate application included in the second group of candidate applications, and only one of the first group of candidate applications and the second group of candidate applications is selected as the target group of candidate applications; and
    setting the application recommendation result of recommended applications by the target group of candidate applications.

7. The non-transitory computer readable medium of claim 6, wherein the program code further instructs the processor to perform following steps for application recommendation:
    determining an application recommendation range according to an event triggered by at least one of location and time; and
    determining the candidate applications according to the application recommendation range.

8. The non-transitory computer readable medium of claim 6, wherein the program code further instructs the processor to perform following steps for application recommendation:
    receiving auxiliary information; and
    analyzing the auxiliary information based on a plurality of predetermined rules, such that the at least one analysis result is generated for said each of the candidate applications.

9. The non-transitory computer readable medium of claim 8, wherein the auxiliary information comprises a user profile data including user preference information.

10. The non-transitory computer readable medium of claim 9, wherein the user preference information comprises at least one of a user-defined recommended application category, a current location of a user device, and a user's preference of applications.

11. A user interface of a user device, comprising:
    a display screen, arranged to show an application hot zone according to an automatically determined application recommendation result of recommended applications, wherein one of a plurality of candidate applications is selectively used as one recommended application in the automatically determined application recommendation result according to analysis results generated for the candidate applications by checking at least one predetermined rule;
    wherein the automatically determined application recommendation result of recommended applications is provided by a processor of the user device; a final score for said each of the candidate applications is calculated according to the at least one analysis result of said each of the candidate applications; final scores of the candidate applications are compared to select a target group of candidate applications from the candidate applications, where the candidate applications include a first group of candidate applications and a second group of candidate applications, a final score of each candidate application included in the first group of candidate applications is larger than a final score of each candidate application included in the second group of candidate applications, and only one of the first group of candidate applications and the second group of candidate applications is selected as the target group of candidate applications; and the automatically determined application recommendation result of recommended applications is set by the target group of candidate applications.

12. The user interface of claim 11, wherein the application hot zone shows application icons of the recommended applications; when a recommended application is not installed in the user device, an application icon of the recommended application is one of a non-transparent icon and a transparent icon; and when the recommended application is installed in the user device, the application icon of the recommended application is another of the non-transparent icon and the transparent icon.

13. The user interface of claim 11, wherein the processor determines an application recommendation range according to an event triggered by at least one of location and time, and determines the candidate applications according to the application recommendation range.

14. The user interface of claim 11, wherein the processor analyzes auxiliary information according to a plurality of predetermined rules, such that the at least one analysis result is generated for said each of the candidate applications.

15. The user interface of claim 14, wherein the auxiliary information comprises a user profile data including user preference information.

16. The user interface of claim 15, wherein the user preference information comprises at least one of a user-defined recommended application category, a current location of a user device, and a user's preference of applications.

* * * * *